(12) United States Patent
Eisenbacher

(10) Patent No.: US 8,607,933 B2
(45) Date of Patent: Dec. 17, 2013

(54) LUBRICANT-DISPENSING SYSTEM AND METHOD OF OPERATING SAME

(75) Inventor: Egon Eisenbacher, Karlstadt (DE)

(73) Assignee: perma-tech GmbH & Co.KG, Euerdorf (DE)

( * ) Notice: Subject to any disclaimer, the term of this patent is extended or adjusted under 35 U.S.C. 154(b) by 1294 days.

(21) Appl. No.: 12/107,922

(22) Filed: Apr. 23, 2008

(65) Prior Publication Data

US 2008/0271950 A1    Nov. 6, 2008

(30) Foreign Application Priority Data

May 4, 2007    (DE) .......................... 10 2007 021 376

(51) Int. Cl.
*F16N 27/00*    (2006.01)
*F16N 11/10*    (2006.01)
*F16N 13/16*    (2006.01)
*F16N 5/00*    (2006.01)

(52) U.S. Cl.
USPC ................................. 184/39; 184/29; 184/7.4

(58) Field of Classification Search
USPC ................................................ 184/19, 39, 29
See application file for complete search history.

(56) References Cited

U.S. PATENT DOCUMENTS

| 4,023,648 | A | * | 5/1977 | Orlitzky et al. | 184/39 |
| 4,671,386 | A | * | 6/1987 | Orlitzky | 184/39 |
| 4,744,442 | A | * | 5/1988 | Bras et al. | 184/39 |
| 5,404,966 | A | * | 4/1995 | Yang | 184/39 |
| 5,538,605 | A | | 7/1996 | Joshi et al. | 204/266 |
| 5,788,012 | A | * | 8/1998 | Yang | 184/6.4 |
| 5,968,325 | A | * | 10/1999 | Oloman et al. | 204/230.5 |
| 5,992,706 | A | * | 11/1999 | Patterson et al. | 222/386.5 |
| 6,299,743 | B1 | * | 10/2001 | Oloman et al. | 204/252 |

FOREIGN PATENT DOCUMENTS

| DE | 3722708 | 1/1986 |
| DE | 3532335 | 3/1987 |
| DE | 10360186 | 8/2005 |
| DE | 102005035452 | 2/2007 |

* cited by examiner

*Primary Examiner* — William A Rivera
*Assistant Examiner* — Henry Liu
(74) *Attorney, Agent, or Firm* — Andrew Wilford

(57) ABSTRACT

A lubricant dispenser has a housing whose interior is subdivided by a shiftable piston into a generally closed gas compartment and a lubricant compartment having an outlet port and filled with a body of lubricant. A gas generator associated with the gas compartment is electrically energizable to produce gas and thereby pressurize the gas compartment, shift the piston, and express lubricant from the outlet. A controller including a power supply and a circuit is connected between the power supply and the gas generator for feeding current from the power supply to the gas generator. During a first predetermined part of an operational cycle of the dispenser, the gas generator is energized at a first level. During a second predetermined part of an operational cycle after the first time, the gas generator is energized at a second level lower than the first level.

3 Claims, 2 Drawing Sheets

LUBRICANT-DISPENSING SYSTEM AND METHOD OF OPERATING SAME

FIELD OF THE INVENTION

The present invention relates to a lubricant-dispensing system. More particularly this invention concerns a method of operating such a system.

BACKGROUND OF THE INVENTION

DE 10 2005 035 452 A1 discloses a lubricant dispenser having a housing whose interior is subdivided by a shiftable piston into a generally closed gas compartment and a lubricant compartment having an outlet port and filled with a body of lubricant. A gas generator associated with the gas compartment is electrically energizable to produce gas and thereby pressurize the gas compartment, shift the piston, and express lubricant from the outlet. A controller including a power supply and a circuit is connected between the power supply and the gas generator for feeding current from the power supply to the gas generator. Normally the generator is constructed such that the rate (volume/time) of gas it generates is related to the current level applied to it. Such a gas generator can be a current-generating zinc-air cell or the power supply can be a lithium battery.

The gas-generation rate may be controlled by means of the controller so that a discontinuous supply of lubricant is possible. With regard to the amount of lubricant supplied, it is assumed that the amount of gas emitted by the gas generator is proportional to the amount of lubricant emitted. In practice, however, considerable deviations from proportionality of this sort have been observed, in particular at the start of an operational cycle and again after it has been running for a while.

DE 37 22 708 discloses a lubricant dispenser that has a container with an electrolyte liquid as its gas generating element. In order to generate the gas, voltage provided by a battery is applied to the electrolyte liquid via electrodes. Here as well, the gas-generation rate is presumed to be proportional to the rate of current. Because the electrolysis process is temperature dependent to a large degree, a change in the gas-generation rate is observed at a predetermined differential voltage on the electrodes at different temperatures. For this reason, a controller is provided that does not keep the voltage on the electrodes constant, but rather the current level. On startup, in spite of the constant current, lubricant is nonetheless emitted only after a certain delay, and a certain reduction in the amount of lubricant emitted may also occur as the lubrication process proceeds.

U.S. Pat. No. 5,968,325 discloses a gas-generation element for a lubricant dispenser embodied as a galvanic cell that is distinguished by a low degree of temperature dependence. In order to guarantee uniform emission of lubricant, the controller may be provided with a temperature and/or pressure sensor as part of a feedback-control system. Providing and mounting the sensor in the housing increases production costs for the lubricant dispenser, and a correspondingly expensive controller is necessary as well in order to process the sensor data.

OBJECTS OF THE INVENTION

It is therefore an object of the present invention to provide an improved lubricant dispenser and method of operating same.

Another object is the provision of such an improved lubricant dispenser and method of operating same that overcomes the above-given disadvantages, in particular that, in a simple fashion, allows a uniform emission of lubricant or, alternately, a variable amount as needed.

SUMMARY OF THE INVENTION

A lubricant dispenser has a housing whose interior is subdivided by a shiftable piston into a generally closed gas compartment and a lubricant compartment having an outlet port and filled with a body of lubricant. A gas generator associated with the gas compartment is electrically energizable to produce gas and thereby pressurize the gas compartment, shift the piston, and express lubricant from the outlet. A controller including a power supply and a circuit is connected between the power supply and the gas generator for feeding current from the power supply to the gas generator. According to the invention, during a first predetermined part of an operational cycle of the dispenser, the gas generator is energized at a first level. During a second predetermined part of an operational cycle after the first part the gas generator is energized at a second level different from the first level. The first part is a startup phase of the operational cycle and the first level represents a maximum level of energization by the power supply.

Thus in accordance with the invention the gas-generation rate is increased by the controller during a brief period relative to the overall operating time at the start of the operation time. The invention is based on the discovery that, in practice, it is not possible to assume that the amount of lubricant emitted for each unit of time over the entire operating time will depend on the rate of gas generation in a linear fashion. Normally, when the lubricant dispenser has been started up, there no pressure has built up in the gas-generation compartment, such that the gas generated during the startup phase initially only serves to pre-compress the gas-generation compartment, the lubricant compartment, and any dead volume as well as to overcome any startup friction in the dispenser. In order to prevent insufficient lubrication at the start of an operating cycle, it is therefore advantageous for the gas-generation rate to be considerably elevated at the start. In the context of a particularly preferred embodiment, provision has been made for the maximum achievable current level to be set by the controller for the duration of the startup phase such that the gas-generation rate is maximized. In this case, the operating pressure of the lubricant dispenser is attained in the quickest manner possible, minimizing the danger of insufficient lubrication.

According to the invention, in addition to the short-term provision of the working pressure by increasing the current level at the start of an operational cycle, as emission continues, the current level flowing over the electrical circuit, and therefore the gas-generation rate as well, is increased continuously or in steps. As the lubricant compartment is progressively emptied, the volume filled with gas increases at the same time; as the volume increases, an increased loss of the gas propellant generated by the gas generator is observed. The portion of the gas propellant that does not serve to propel the lubricant but rather diffuses out of the lubricant dispenser through its walls therefore steadily increases. By virtue of the continuous or gradual increase in the gas-generation rate, it is possible to compensate for these losses. This compensation must be adapted to the entire lubrication cycle, the structure of the housing, and the diffusion behavior of the gas propellant being generated. Particularly high losses result from the use of hydrogen as a gas propellant and a long operating time.

Surprisingly, the behavior of lubricant dispensers with a predetermined structure is the same from one unit to the next in a model line, such that it is possible to provide a quick-start function and/or compensation for gas losses due to diffusion using control parameters developed in advance. The provision of sensors and time-consuming processing of the values measured by the sensors is therefore not necessary. If it is possible to select different operating times when starting up the lubricant dispenser, it is useful for a set of control parameters to be stored in the controller for each of these operating times.

The gas generator may be a current-generating galvanic cell in the context of the invention. Corresponding gas generators are known, for example, from above-cited DE 35 32 335 U.S. Pat. No. 5,968,325. In such a gas generator, the controller may be supplied with power either by the galvanic cell itself or by an additional power supply with the required working voltage. In the context of an alternative embodiment of the invention, provision is made for a container with an electrolyte liquid to be provided as the gas generator, which is connected via electrodes to a separate power supply, preferably a battery of an accumulator. The current required for the electrochemical decomposition of the electrolyte liquid is provided by the separate power supply, with the gas-generation rate depending in a linear or essentially linear fashion on the current level flowing through the gas generator. According to the invention, the controller is preferably a microprocessor. Regulation of the current to the necessary value in accordance with pre-entered standard values may, for example, be performed by means of pulse width modulation with the microprocessor.

At its simplest, the present invention is based on the discovery that, particularly at the start and end of the operation time, there is no precise linear dependency between the amount of lubricant emitted and the gas-generation rate. In order to compensate for dead volume or startup friction at the start of the operation time or increased losses due to diffusion at the end of the operation time, provision is made according to the invention for the gas-generation rate to be increased with reference to established control parameters or a standard generation rate. In this connection, however, partially interrupting or cyclically reducing gas generation should not be ruled out in the context of the invention. Thus, for example, the programming of the microprocessor may be adapted to duty-based operation, with gas generation being provided only once when the lubricated device is used. Correspondingly, it is possible to adapt the gas-generation rate uniform to match a cyclically varying load of the device to be lubricated. In such a case, the increase in the gas-generation rate provided according to the invention with reference to predetermined, established control parameters of the controller relates to a chronological average of the gas-generation rate.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
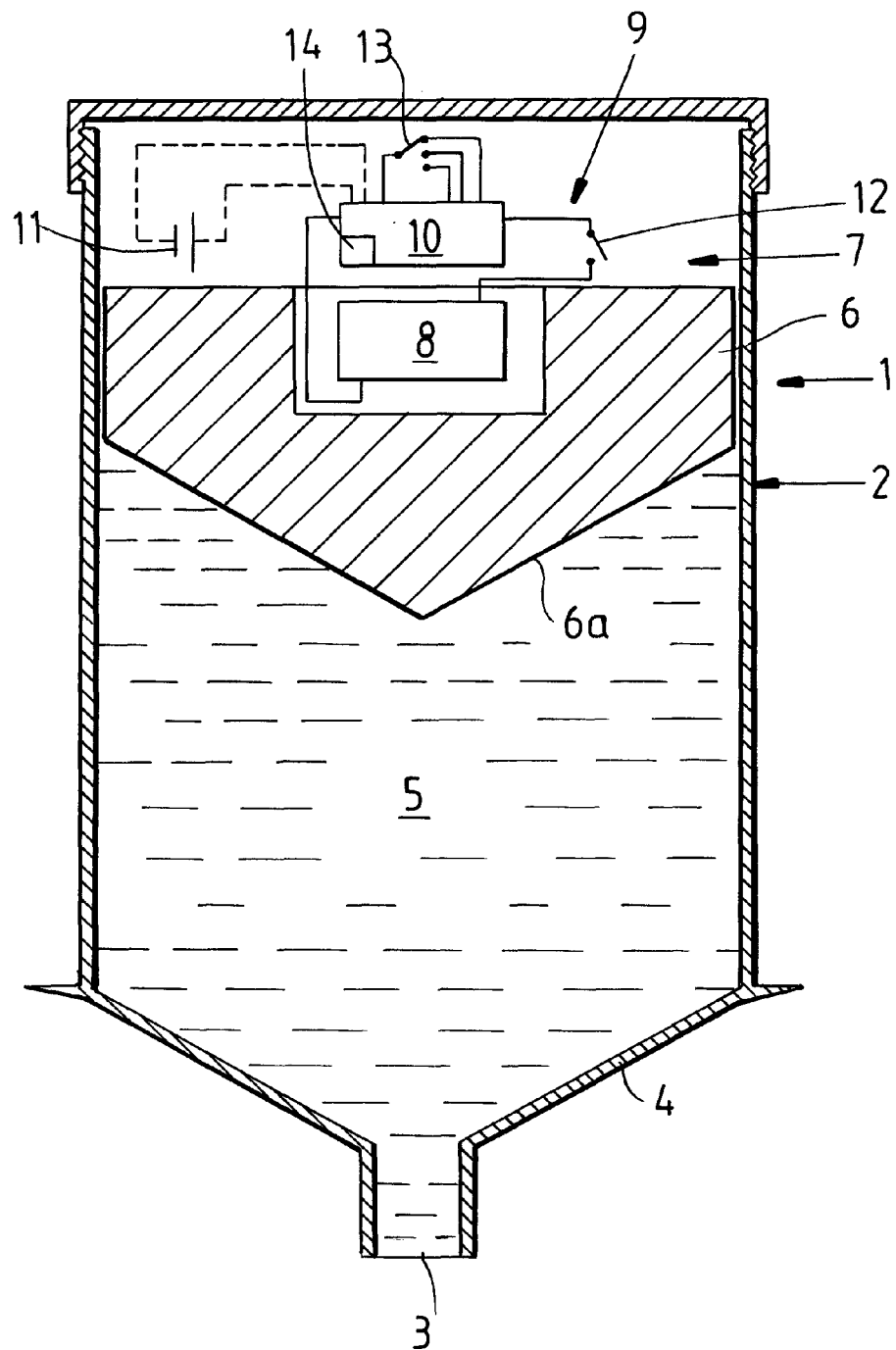
FIG. 1 is a partly schematic section through the gas dispenser according to the invention.

As seen in FIG. 1 a lubricant dispenser has a generally cylindrical housing 2 having a frustoconically and downwardly tapered floor 4 forming an outlet port 3 connectable to a machine part, e.g. a bearing, that is to be lubricated. An interior of the housing 2 is subdivided by a vertically and axially shiftable piston 6 into an upper gas compartment 7 and a lower lubricant-filled compartment 5

A gas generator 8, here a current-generating galvanic cell, is provided in the gas-generation compartment 7, imbedded in an upper side of the piston 6. The gas generator 8 is connected by electrical circuit lines 9 to a controller 10 embodied as a microprocessor and to a power supply, here the galvanic cell or a battery 11 as a separate power supply. In order to start the lubricant dispenser 1, an on- and off-switch 12 must be activated, different operating times being selected using a selector switch 13 connected to the microprocessor. The microprocessor 10 has a memory 14 in which predetermined control parameters are stored. Along with the controller 10, the control parameters produce a continual emission of lubricant and an increase in a gas-generation rate G over a brief time relative to the overall operating time at the start of an operational cycle and/or during emptying of the lubricant compartment 5.

Figure 2:
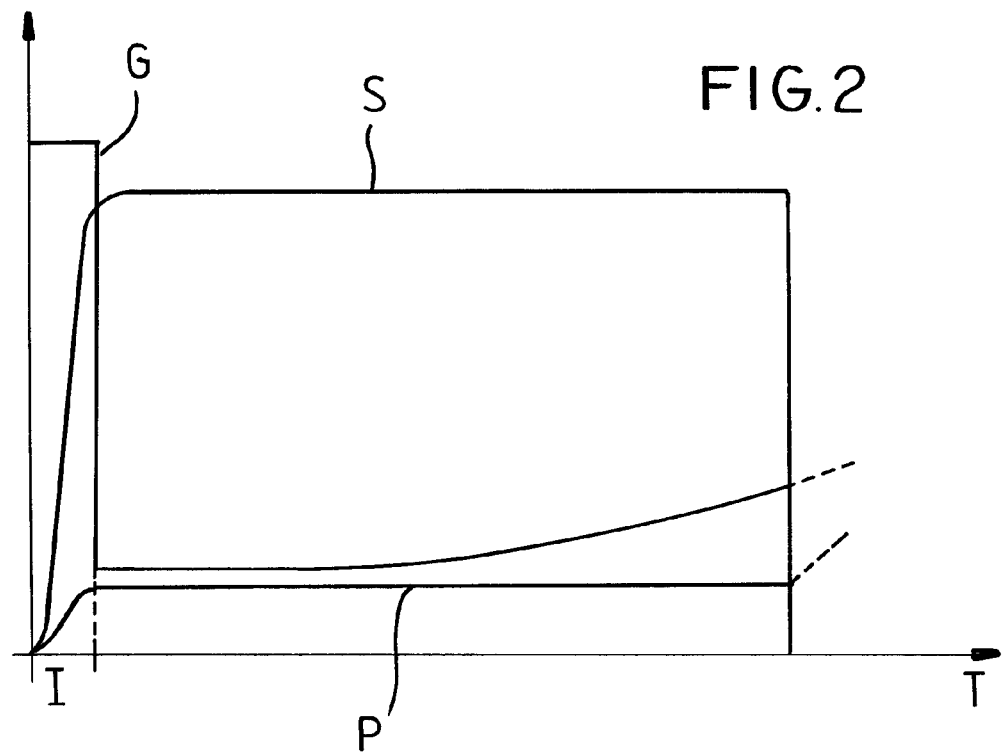
FIGS. 2 and 3 are graphs illustrating operation of the dispenser of FIG. 1.
Figure 3:
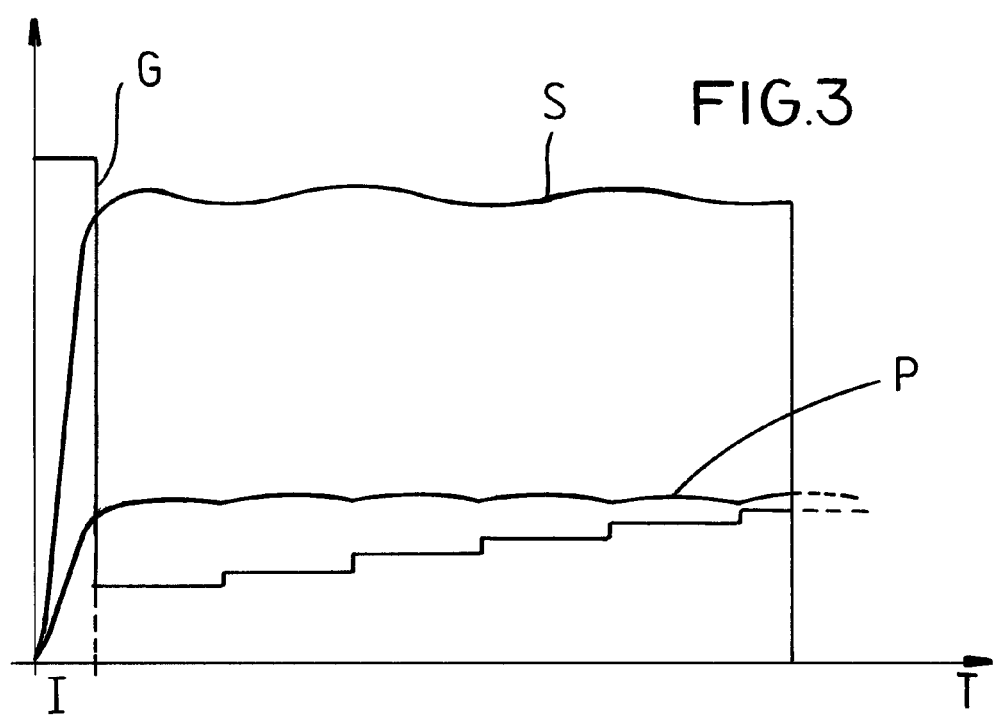

FIGS. 2A and 2B show by way of example the relationship between the gas-generation rate G and the pressure P in the gas-generation compartment 7 as well as the resultant lubricant output S through the housing outlet 3 over an entire operating cycle. The current level flowing through the gas generator 8 and the electrical circuit 9 corresponds to the gas-generation rate G, normally in a linear relationship. During a short startup period or phase I, which is shown in exaggerated size for purposes of clarity, the microprocessor 10 sets the current level at the maximum setting on the basis of the parameters stored in the memory 14, so that the gas-generation rate G is at a maximum as well. Correspondingly, a rapid increase in the pressure P in the gas-generation compartment 7 is seen so that insufficient lubrication at the start of operation is prevented. As the lubricant compartment 5 becomes increasingly empty, the volume inside the housing 2 that is filled with gas increases as well, creating an increased loss of the propellant gas due to diffusion through the wall of the housing 2. According to the invention, in order to compensate for these losses, as the lubricant compartment 5 empties, the gas-generation rate G is increased on the basis of the predetermined, established control parameters either continuously (FIG. 2A) or in steps (FIG. 2B). The increase in the gas-generation rate G compensates for the losses of propellant gas due to diffusion so that the lubricant output S through the housing outlet 3 may be kept approximately constant.

I claim:
1. A method of operating a lubricant dispenser having
  a housing;
  a shiftable piston subdividing an interior of the housing into a generally closed gas compartment and a lubricant compartment;
  a body of lubricant in the lubricant compartment;
  a gas generator associated with the gas compartment and electrically energizable to produce gas and pressurize the gas compartment, shift the piston, and express lubricant from an outlet of the lubricant compartment at a rate generally proportional to a gas pressure in the gas compartment;
  a power supply; and
  a microprocessor having a memory and connected between the power supply and the gas generator, whereby the gas generator can be energized from the power supply via the microprocessor, the method comprising the steps of:
  storing a set of control parameters in the memory;
  during a first predetermined part of predetermined length of an operational cycle of the dispenser corresponding to a startup phase, energizing the gas generator in accor- dance with one of the parameters at a first level corresponding to a maximum gas-generation rate of the device and thereby expressing the lubricant from the lubricant compartment at a corresponding maximum rate; and during a second predetermined part of the operational cycle after the first part, at first energizing the gas generator in accordance with another of the parameters at a second level different from and significantly less than the first level and thereafter increasing regularly so as to compensate for losses of the gas from the gas compartment by diffusion through the housing.

2. The method defined in claim 1 wherein during the second part the second level is increased continuously.

3. The method defined in claim 1 wherein during the second part the second level is increased in steps.

* * * * *

UNITED STATES PATENT AND TRADEMARK OFFICE
CERTIFICATE OF CORRECTION

| | |
|---|---|
| PATENT NO. | : 8,607,933 B2 |
| APPLICATION NO. | : 12/107922 |
| DATED | : December 17, 2013 |
| INVENTOR(S) | : Egon Eisenbacher |

It is certified that error appears in the above-identified patent and that said Letters Patent is hereby corrected as shown below:

On the title page item (73), should read perma-tec GmbH & Co.KG

Signed and Sealed this
First Day of April, 2014

Michelle K. Lee
*Deputy Director of the United States Patent and Trademark Office*